(12) United States Patent
Krylov et al.

(10) Patent No.: US 7,408,702 B2
(45) Date of Patent: Aug. 5, 2008

(54) BIDIRECTIONAL OPTICAL AMPLIFIER

(75) Inventors: Dmitriy Krylov, Red Bank, NJ (US); Luc Boivin, Tinton Falls, NJ (US)

(73) Assignee: Ciena Corporation, Linthicum, MA (US)

( * ) Notice: Subject to any disclaimer, the term of this patent is extended or adjusted under 35 U.S.C. 154(b) by 98 days.

(21) Appl. No.: 11/041,927

(22) Filed: Jan. 26, 2005

(65) Prior Publication Data

US 2006/0087724 A1 Apr. 27, 2006

Related U.S. Application Data

(60) Provisional application No. 60/621,516, filed on Oct. 25, 2004.

(51) Int. Cl.
*H01S 3/00* (2006.01)
(52) U.S. Cl. .................................. 359/341.42
(58) Field of Classification Search ............. 359/341.42
See application file for complete search history.

(56) References Cited

U.S. PATENT DOCUMENTS

| | | | |
|---|---|---|---|
| 5,452,124 A | 9/1995 | Baker | |
| 5,604,627 A | 2/1997 | Kohn | |
| 5,742,416 A | 4/1998 | Mizrahi | |
| 6,018,404 A | 1/2000 | Meli et al. | |
| 6,130,775 A | 10/2000 | Yang | |
| 6,323,994 B1 * | 11/2001 | Li et al. | 359/341.1 |
| 6,381,049 B1 | 4/2002 | Xu et al. | |
| 6,496,305 B2 | 12/2002 | Spock et al. | |
| 6,903,324 B2 * | 6/2005 | Tomofuji et al. | 250/214 LA |
| 7,024,117 B1 * | 4/2006 | Gottwald | 398/92 |
| 7,058,304 B2 * | 6/2006 | Tai et al. | 398/65 |

OTHER PUBLICATIONS

Seikai et al. Novel Optical Circuit Suitable for Wavelength Division Bidirectional Optical Amplification. Electronics Letters. Jul. 8, 1993. vol. 29. No. 14. pp. 1268-1270.*

Garrett, et al., Bidirectional ULH Transmission of 160-Gb/s Full-Duplex Capacity Over 5000 km in a fully Bidirectional Recirculating Loop. Photonics Technology Letters, IEEE, Jul. 2004. vol. 16, Issue 7. pp. 1757-1759.

* cited by examiner

*Primary Examiner*—Deandra M Hughes
(74) *Attorney, Agent, or Firm*—Muncy, Geissler, Olds & Lowe, PLLC

(57) ABSTRACT

A bidirectional amplification system and method are disclosed. A single optical line amplifier and isolation loss filters are used to amplify signals in both the east and west directions with sufficient gain along a fiber.

13 Claims, 6 Drawing Sheets

BIDIRECTIONAL OPTICAL AMPLIFIER

CROSS-REFERENCE TO RELATED APPLICATIONS

This application claims priority under 35 U.S.C. § 119(e) on U.S. Provisional Patent Application No. 60/621,516 filed on Oct. 25, 2004. The disclosure of which is incorporated herein by reference in its entirety.

FIELD OF THE INVENTION

The present invention relates to signal amplifiers, in particular to optical bidirectional signal amplifier nodes.

BACKGROUND OF THE INVENTION

In current large-scale networks, information flows through a series of nodes in the network from one location or site to another. As the network grows, more and more transmission lines may be added to handle the heavy traffic flow between nodes. FIG. 1 illustrates a related art system 100 that has east 110 and west 140 terminals. The east 110 and west 140 terminals communicate via lines (e.g., lines 152, 154, 156 and 162, 164, 166) that run between the terminals (e.g., optical fiber pairs 156 and 166, 164 and 154, 152 and 162. East 110 and west 140 terminals can be located a significant distance apart.

Accordingly, line amplifier nodes (e.g., 120, 130) can be interposed between the terminals (e.g., every 40-80 kilometers) to compensate for the signal loss in the transmission medium (e.g., optical fiber) by amplifying the signal. Additionally, associated dispersion compensation modules (e.g., DCMs 122, 128, 132 and 138) can be added to correct for the signal degradation caused by the transmission medium (e.g., dispersion in the optical fibers). Further, to increase the bandwidth available each east and west line can have a plurality of channels communicated on separate bands (e.g., red and blue signals), as is known in the art.

If the bandwidth provided by both bands is not needed for each direction, a single fiber can be used to carry both directions using one band for the east direction and one band for the west. There are several implementations of a bidirectional optical communication on a single fiber. These single-fiber implementations use counter-propagating channels from two non-overlapping bands of the optical spectrum. Although this system configuration can reduce the number of fibers for bidirectional communication, it can further complicate design of the amplifier nodes. For example, in one solution the red and blue signals are separated at respective inputs, routed through separate amplifiers, and then recombined at the respective outputs. However, this configuration still requires two amplifiers per node, one for each direction.

FIG. 2 illustrates an alternative configuration according to the related art for designing a bidirectional amplifier as disclosed in U.S. Pat. No. 6,018,404 entitled "Bidirectional Optical Telecommunication System Comprising a Bidirectional Optical Amplifier." The bidirectional amplifier configuration includes four wavelength (λ) selective optical couplers 221-224, one unidirectional optical amplifying unit 220, two optical connectors 206, 207 and portions 225, 226, 227, 228 of passive optical fiber. The components are coupled with each other to form an optical bridge connection. This configuration uses only one amplifier 220. However, it does not achieve a useful gain when the typical 40 dB optical return loss is taken into consideration.

As illustrated in FIG. 2, two signals $\lambda_1$ and $\lambda_2$ pass along a fiber, in opposite direction. The fiber is connected via connectors 206 and 207. Wavelength selective couplers 221-223, split the signals so that they enter the optical amplifier 220 from the same direction, are amplified, and then split by the wavelength couplers 221, 223, and 224 to continue their travel along a common fiber in opposite directions. In the operation of the system described, some of the signals are leaked in the wrong direction (e.g., leakage of amplified signal $\lambda_1$ 254 through coupler 224 that is reflected back 252 from coupler 221 to connector 206), which is called optical return loss (ORL). The general formula that governs the return loss is:

$$P_{return} = P_{in} + G - 2L_{isolation} \quad (1)$$

$$ORL = P_{in} - P_{return}, \quad (2)$$

where, P is power, G is amplifier gain, $L_{isolation}$ is isolation loss through the device and ORL is optical return loss. Typically, $L_{isolation}$ for conventional filters, couplers and the like is 20 dB. Accordingly the maximum gain $G_{max}$ calculated for a four module system is:

$$G_{max} = 2L_{isolation} - ORL = 2L_{isolation} - 40 = 0 \quad (3)$$

Applying this general equation to the configuration illustrated in FIG. 2 yields:

$$P_{return} = P_{in} + G - L_{224} - L_{221}; \text{ and}$$

$$G_{max} = L_{224} + L_{221} - ORL = 20 + 20 - 40 = 0 \quad (4)$$

where $L_{224}$ and $L_{221}$ are the isolation losses through those corresponding devices. As determined in the foregoing sections, $G_{max}$ should be set to zero to avoid excessive amplified signal leakage. Additionally, the four-port configuration also suffers from poor performance when there is a fiber break, which can result in a 14 dB back-reflection.

BRIEF DESCRIPTION OF THE DRAWINGS

Advantages of embodiments of the present invention will be apparent from the following detailed description of the preferred embodiments thereof, which description should be considered in conjunction with the accompanying drawings in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The expressions "communicates", "coupled", "connection", and "connected" as used herein refers to any connection, coupling, link and other methods/devices known by one skilled in the art by which optical signals carried by one optical system element are imparted to the "communicating" element. Further, the devices described can be operatively connected (e.g., are not directly connected to one another) and can be separated by intermediate optical components or devices.

Additionally, the terns band-splitting filter and band-splitting filter module (BSM) can be used interchangeably and refer to any element that can separate and/or combine optical signals propagating at separate frequencies. The signals may be aggregated into frequency bands ("bands") that typically are non-overlapping frequency ranges that can contain multiple signals, as is known in the art.

Figure 3:
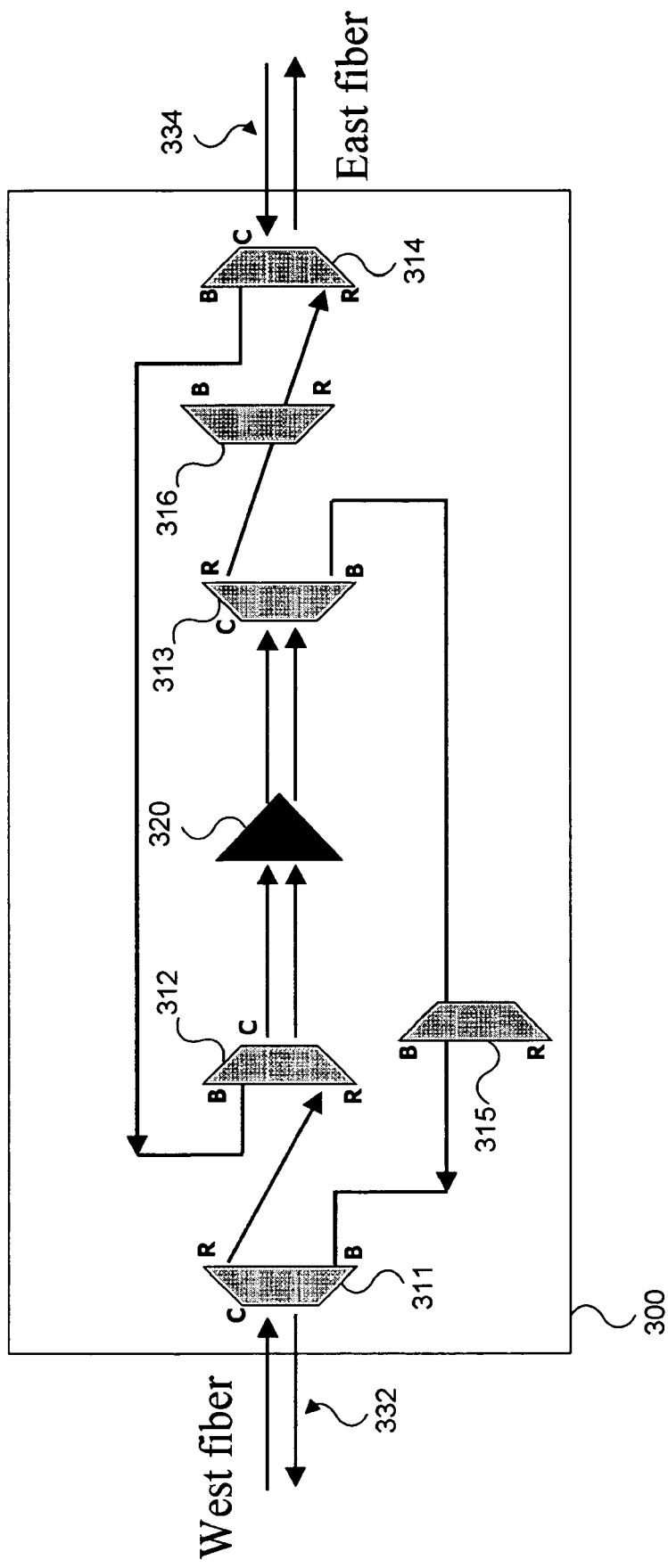
FIG. 3 illustrates an optical line amplifier node in accordance with at least one embodiment of the invention.

Referring to FIG. 3, an optical amplifier module 300 in accordance with at least one embodiment of the invention is illustrated. The optical amplifier module 300 can be a bidirectional optical amplifier, although the invention is not limited to only bidirectional communication. For illustrative purposes only, the optical amplifier module 300 will be assumed to be a bidirectional optical amplifier 300, in accordance with at least one exemplary embodiment. The bidirectional optical amplifier 300 can be used in a single-fiber as well as in fiber-pair bidirectional links. For example, a single optical amplifier (OA) is used to amplify optical dense wave division multiplexed (DWDM) signals traveling in opposite directions, thus reducing equipment cost. Channels propagating in opposite directions are chosen from two non-overlapping bands (e.g., the C-Band, Red (R) band and Blue (B) band). The bidirectional optical amplifier module 300 can incorporate multiple band-splitting filter modules (e.g., six band-splitting filter modules 311-316). Modules 311 through 314, route the counter-propagating signals into the optical amplifier 320, then out into the signal's original propagating directions. Modules 315 and 316 are used to provide increased optical return loss of 40 dB in each direction to meet a 40 dB Optical Return Loss (ORL) specification.

For example, the DWDM (or WDM) signals traveling in the opposite directions are chosen to be from two non-overlapping bands of the optical spectrum red (R) and blue (B). Band-splitting modules 311-316 can be used to route the counter-propagating signals to and from the OA 320. In accordance with at least one embodiment of the invention, adding extra filtering (e.g., modules 315 and 316) improves the overall performance of the amplifier module 300. Those skilled in the art will appreciate that modules 315 and 316 can be band specific filters or can be band-splitting modules, which use only two of the three ports as illustrated. Further, any element that passes the appropriate band and provides additional isolation can be used for modules 315 and 316, such as thin-film filters, fiber Bragg grating (FBG) filters, and array waveguide (AWG) filters. However, those skilled in the art will appreciate that the invention is not limited to the examples provided.

Accordingly applying a similar gain calculation as provided in Eq. 3 to the configuration of FIG. 3 yields:

$$G_{max} = (L_{311} + L_{313} + L_{315}) - ORL \qquad (5)$$

where $L_{311}$, $L_{313}$, and $L_{315}$ are the respective isolation through each module for the blue signal. Note that only one side of the return path (e.g., 313, 315, 311) after amplification is used in the calculation of the maximum gain $G_{max}$ as these will typically be balanced with the isolation values in the other return path (313, 316, 314), for the red signal. If these isolation values are not equal, then the $G_{max}$ can be calculated using the return path that has the minimum isolation values. For example, the isolation values can be different if slightly different band-passing filters are used. Likewise, manufacturing variations between any two modules might differ by as much as couple dB.

However, in at least one embodiment, the values for the filter modules 311-316 can be substantially the same nominal value L. Therefore, equation 5 can be reduced to:

$$G_{max} = 3L - ORL. \qquad (6)$$

Using typical values for thin-film elements, L is equal to 20 dB and as noted above the value for ORL is typically 40 dB. Applying these values to equation 6 yields:

$$G_{max} = 3(20\ dB) - 40\ dB = 20\ dB. \qquad (7)$$

Accordingly, adding the additional filter modules (315, 316) allows for a useful maximum gain of 20 dB.

However, those skilled in the art will appreciate that the invention is not limited to any specific values. For example, equations 5 or 6 can be used to easily determine the maximum gain for any values or can be use to determined the required isolation values for a desired maximum gain.

Accordingly, at least one embodiment of the invention can include an optical amplifier module 300, as generally illustrated in FIG. 3. A first band-splitting module (BSM) 311 can be coupled to a first communication fiber 332 to receive a first signal (e.g., a Red band signal) propagating in a first direction (e.g., W-E). A second BSM 314 can be coupled to a second communication fiber 334 to receive a second signal (e.g., a Blue band signal) propagating in a second direction (e.g., E-W). A third BSM 312 can be coupled to the first BSM 311 to receive the first signal, coupled to the second BSM 314 to receive the second signal, and coupled to an amplifier 320. The third BSM 312 is configured to combine the first and the second signals and provide a combined signal traveling in a common direction to the amplifier 320. For example, as discussed above a BSM can split and/or combine signals having different frequency bands. As illustrated, the third BSM 312 is a 3 port device (R, B, and C) that can receive signals on the R and B ports and output a combined signal (e.g., having both Red and Blue signal) at the C port. Likewise, after the combined signal is amplified, a fourth BSM 313 can be coupled to the amplifier 320 to separate the combined signal into amplified first and amplified second signals. A first filter 315 can be coupled between the first BSM 311 and the fourth BSM 313 to receive the amplified second signal from the fourth BSM 313 and to propagate the amplified second signal to the first BSM 311. The first BSM 311 directs the amplified second signal to the first communication fiber 332. A second filter 316 can be configured to receive the amplified first signal from the fourth BSM 313 and to propagate the amplified first signal to the second BSM 314. Likewise, the second BSM 314 directs the amplified first signal to the second communication fiber 334. Accordingly, a common fiber can be used to propagate both signals (e.g., Red and Blue bands) between nodes in an optical communication network as further illustrated in FIG. 5.

Figure 4:
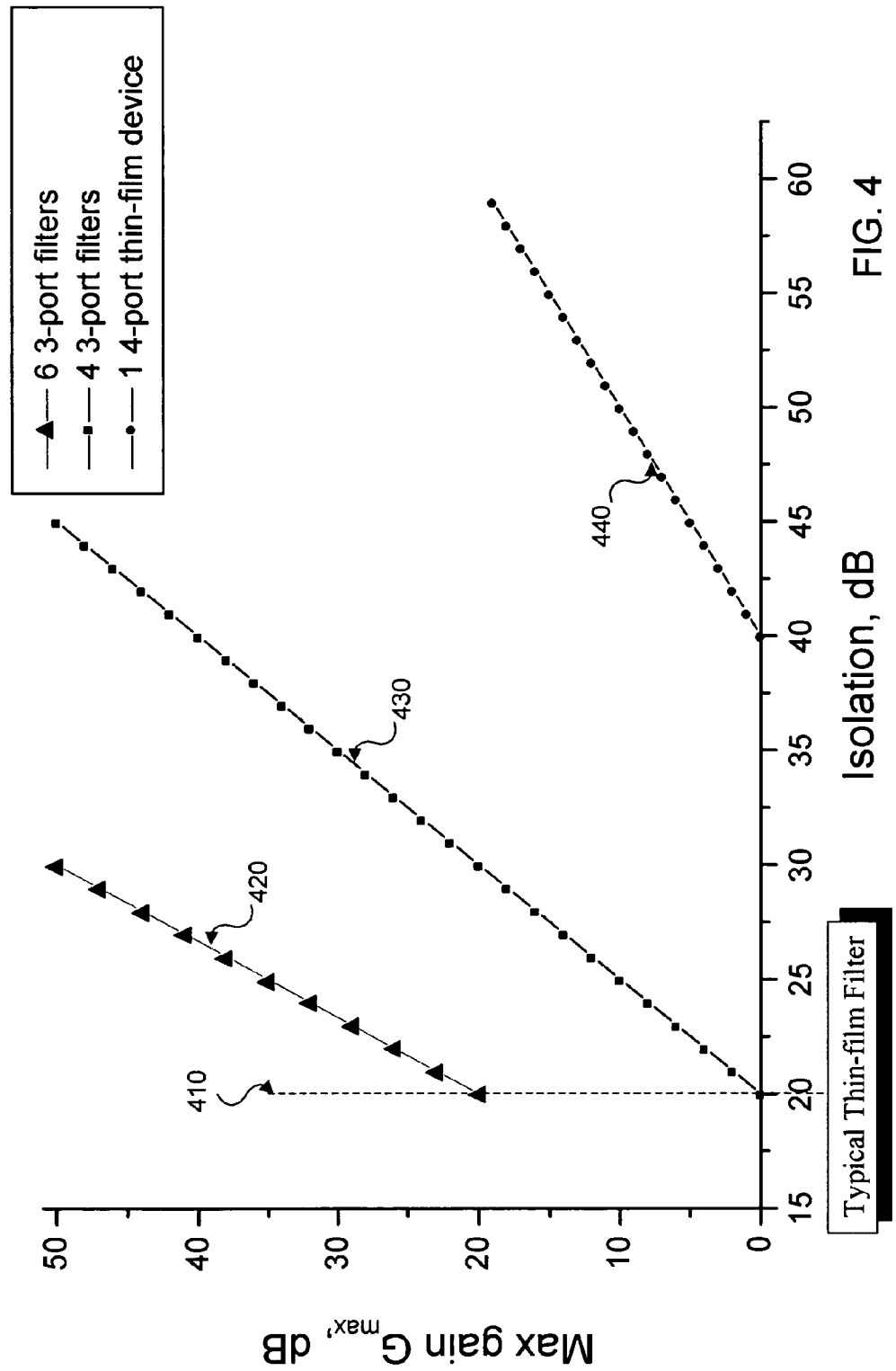
FIG. 4 is a graph of the maximum gain for various configurations of at least one embodiment of a single-fiber bidirectional optical amplifier compared to conventional systems.

FIG. 4 is a graph of the maximum gain for various configurations of a single-fiber bidirectional optical amplifier assuming an ORL value of 40 dB. As illustrated in FIG. 4, the six-module system 420 according to embodiments of the invention provides for a maximum gain of 20 dB using conventional thin-film elements. As illustrated by line 410, conventional thin-film elements typically have isolation values of 20 dB. The related art four-module system as illustrated by line 430 does not allow for any gain, if the system is going to meet the 40 dB ORL specification. Likewise, a single module four-port thin-film device as illustrated by line 440 does not allow for any gain, if the system is going to meet the 40 dB ORL specification. For the configurations illustrated by lines 430 and 440, devices with significantly higher isolation values are required. However, designing a system using the required high isolation devices is not practical because of the lack of availability and increased costs of these devices.

Figure 1:
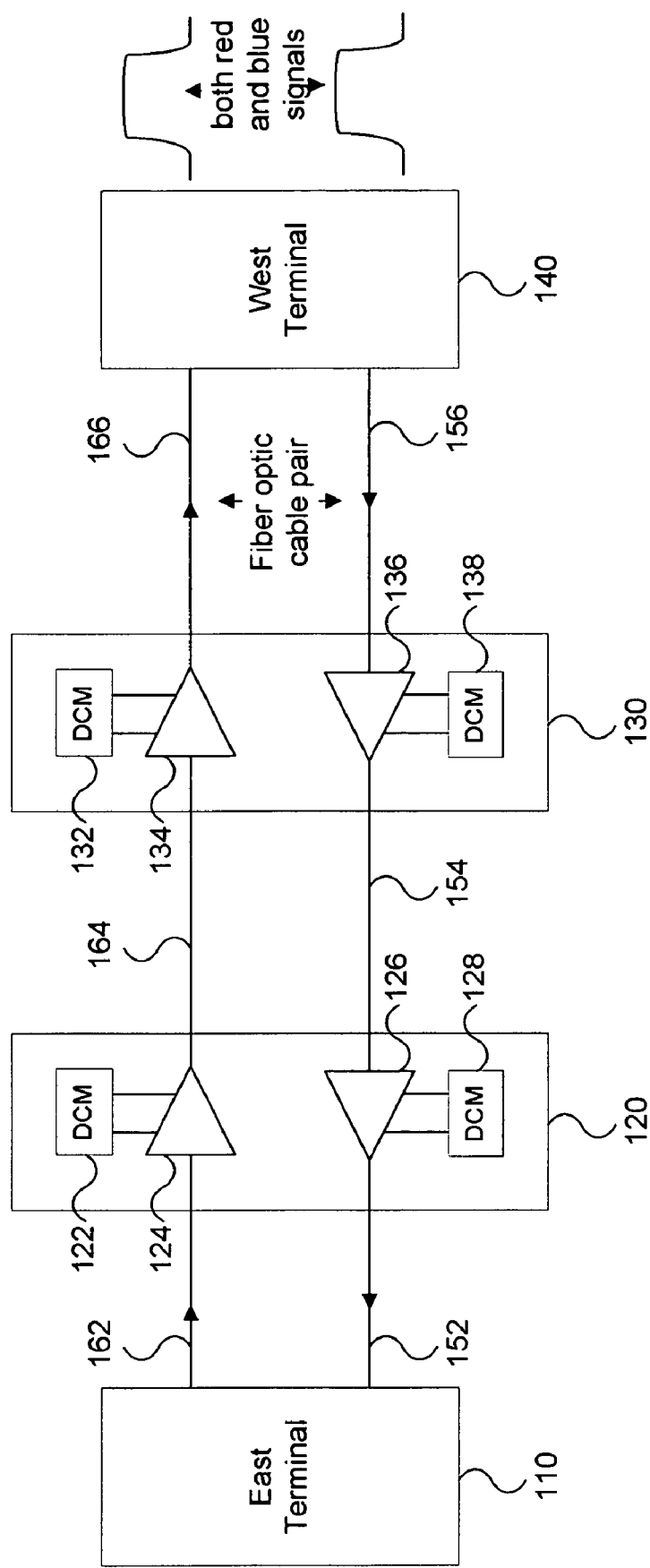
FIG. 1 illustrates a bidirectional communication system in accordance with the related art.
Figure 2:
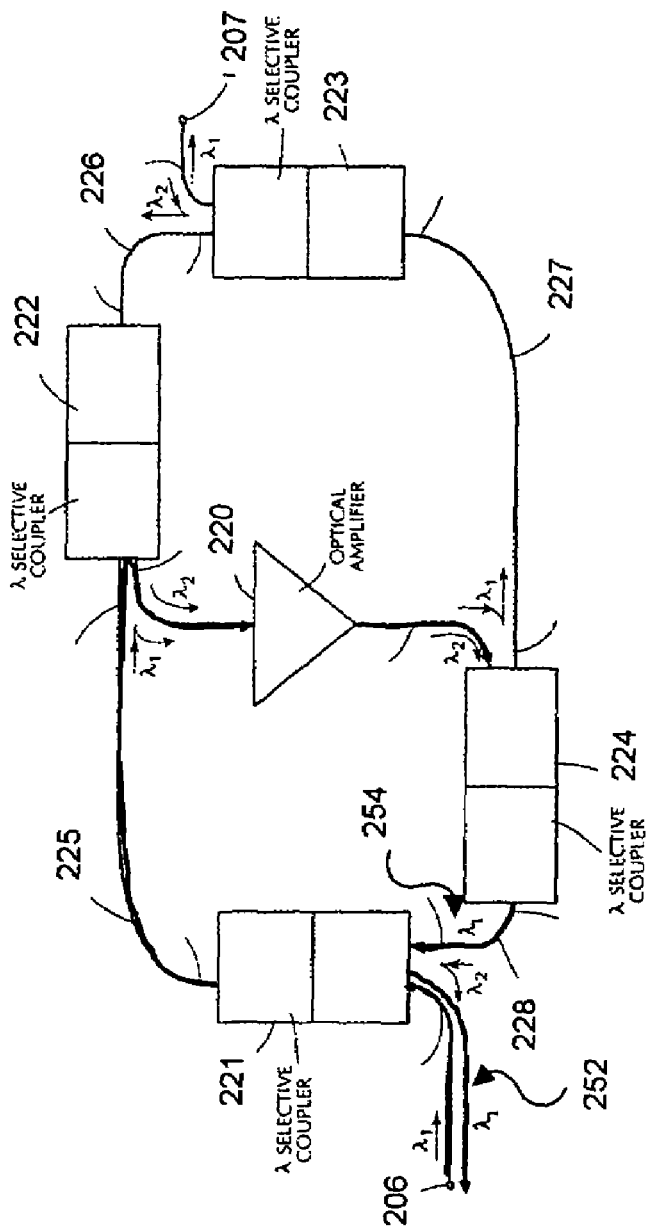
FIG. 2 illustrates an optical line amplifier node in accordance with the related art.
Figure 5:
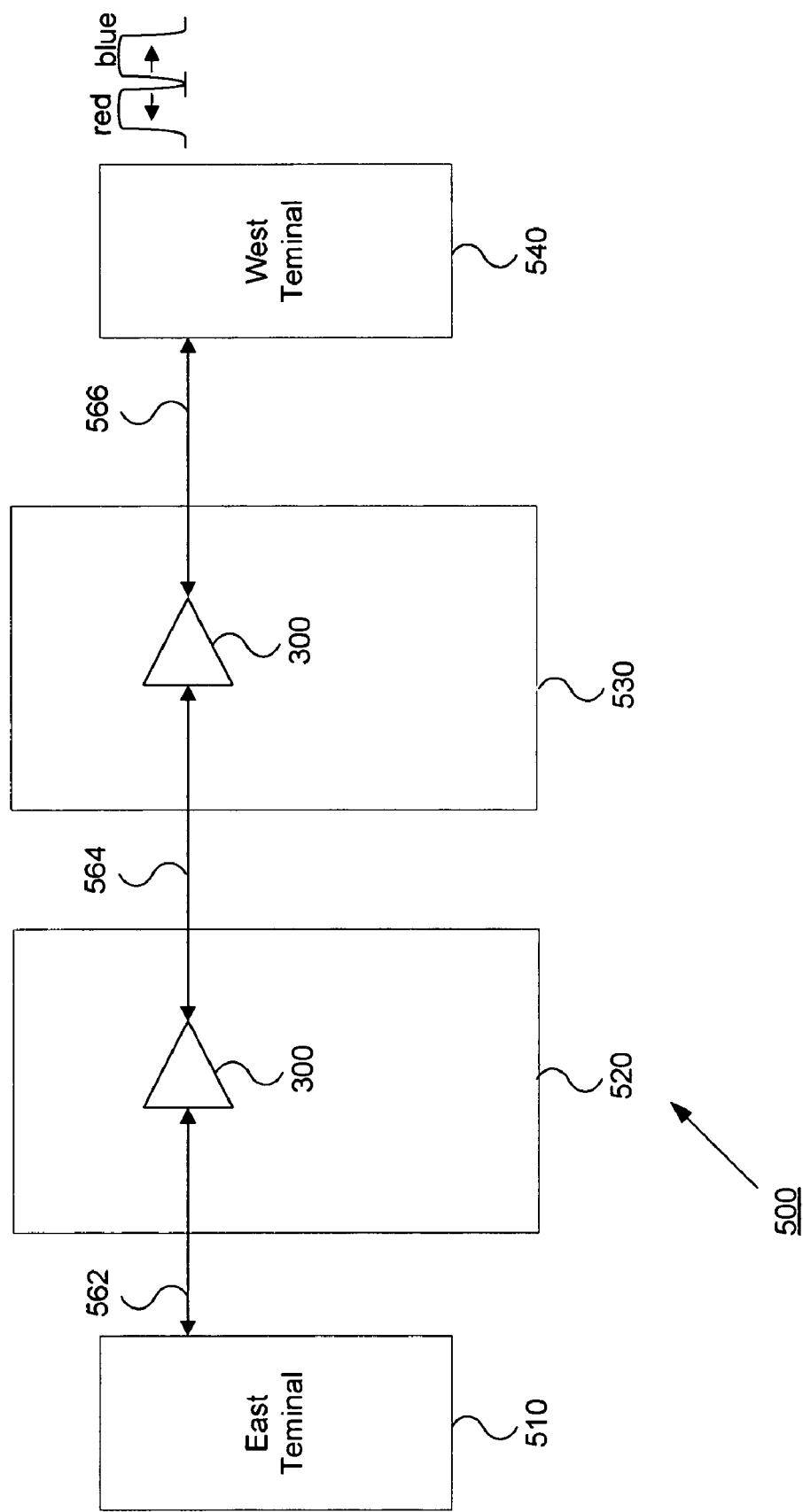
FIG. 5 illustrates a bidirectional communication system in accordance with at least one embodiment of the invention.

Referring to FIG. 5, a portion of a network 500 in accordance with at least one embodiment of the invention is illustrated. Network 500 has an east terminal 510 and west terminal 540. The east 510 and west 540 terminals communicate via lines (e.g., 562, 564, 566) that interconnect the terminals and nodes (e.g., optical line amplifier nodes 520 and 530). In contrast to the system of FIG. 1, the present network can use one bidirectional line. Further, as previously discussed, amplifiers (e.g., 300) can be added to boost the signals, because of the distance between terminals 510, 540. However, since the east and west signal traffic (e.g., red or blue) can propagate on a single fiber, the red and blue signals can be amplified as illustrated in FIG. 3 using a common amplifier. Accordingly, since both east to west and west to east signals are combined for amplification, the number of amplifier modules can be reduced by half over the related art system of FIG. 1 and still can meet the 40 dB ORL specification.

Figure 6:
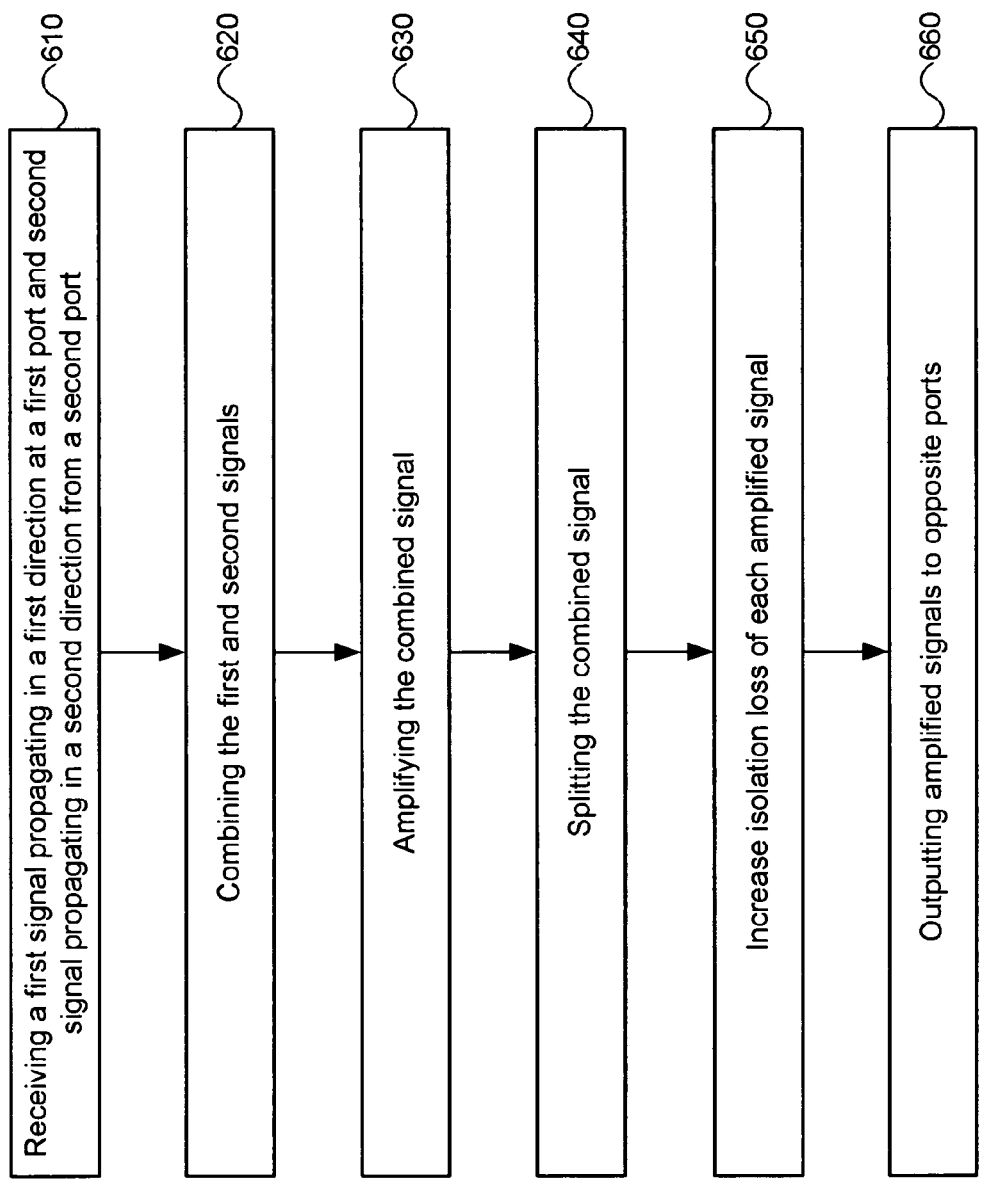
FIG. 6 illustrates a method of single amplifier amplification of multiple signals, in accordance with at least one exemplary embodiment of the invention.

In view of the foregoing disclosure, those skilled in the art will recognize that embodiments of the invention include methods of performing the sequence of actions, operations and/or functions discussed herein. For example, FIG. 6 illustrates a method in accordance with at least one exemplary embodiment. As discussed above, multiple signals having multiple wavelengths can propagate in opposite directions along a single optical fiber. The method includes receiving a first signal propagating in a first direction from a first port and second signal propagating in a second direction from a second port, block 610. The first and second signals are combined into a combined signal propagating in one direction, block 620. The combined signal is then amplified, block 630. The combined signal is then split into amplified first and amplified second signals, block 640. The isolation loss of each amplified signal is increase, block 650. Then, the amplified first signal propagating in the first direction is output at the second port and the amplified second signal propagating in the second direction is output at the first port, block 660.

The foregoing discussion and related illustration is merely an example of aspects of the invention and the invention is not limited to this example. Further, other methods and alternatives can be recognized by those skilled in the art, and the illustrated example is not intended as limiting of the methods disclosed herein.

Accordingly, the foregoing description and accompanying drawings illustrate the principles, preferred embodiments and modes of operation of the invention. However, the invention should not be construed as being limited to the particular embodiments discussed above.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for bidirectional amplification in an optical network, the method comprising:
   receiving a first signal propagating in a first direction from a first port and second signal propagating in a second direction from a second port;
   combining the first signal and the second signal into a combined signal propagating in one direction;
   amplifying the combined signal;
   splitting the combined signal into amplified first and amplified second signals;
   increasing an isolation loss of each amplified signal; and
   outputting the amplified first signal propagating in the first direction at the second port and the amplified second signal propagating in the second direction at the first port
   wherein increasing the isolation loss of each amplified signal is a result of each amplified signal passing through more optical elements than the combined signal; and
   wherein there are six optical elements and wherein two optical elements are in each input path and three optical elements are in each amplified output path.

2. The method of claim 1, wherein increasing an isolation loss of each amplified signal comprises:
   propagating the amplified first signal to a first filter; and
   propagating the amplified second signal to a second filter.

3. The method of claim 1, wherein the first signal comprises a first plurality of wavelengths in a first band and the second signal comprises a second plurality of wavelengths in a second band.

4. The method of claim 1, wherein each optical element is a band splitting module.

5. The method of claim 2, wherein at least one the first filter and the second filter is at least one of a band splitting module, a thin-film filter, a fiber Bragg grating (FBG) filter, or an array waveguide (AWG) filter.

6. The method of claim 2, wherein the amplified first signal comprises the first plurality of wavelengths in the first band and wherein the amplified second signal comprises the second plurality of wavelengths in the second band.

7. The method of claim 4, wherein each additional band splitting module in each amplified output path increases the isolation loss by approximately 20 dB.

8. An apparatus for bidirectional amplification in an optical network, the apparatus comprising:
   means for receiving a first signal propagating in a first direction from a first port and second signal propagating in a second direction from a second port;
   means for combining the first signal and the second signal into a combined signal propagating in one direction;
   amplifier means for amplifying the combined signal;
   means for splitting the combined signal into amplified first and amplified second signals;
   means for increasing an isolation loss of each amplified signal; and
   means for outputting the amplified first signal propagating in the first direction at the second port and the amplified second signal propagating in the second direction at the first port.

9. The apparatus of claim 8, wherein the means for increasing an isolation loss of each amplified signal is at least one filter element.

10. The apparatus of claim 8, wherein the means for increasing the isolation loss of each amplified signal results in each amplified signal passing through more optical elements than the combined signal.

11. The apparatus of claim 10, wherein there are six optical elements and wherein two optical elements are in each input path and three optical elements are in each amplified output path.

12. The apparatus of claim 11, wherein each optical element is a band splitting module.

13. The apparatus of claim 12, wherein each additional band splitting module in each amplified output path increases the isolation loss by approximately 20 dB.

* * * * *